Feb. 23, 1932.        G. VAN DAAM        1,846,233
MEANS FOR CLEANING, MOISTENING, AND HEATING AIR
Filed June 4, 1930
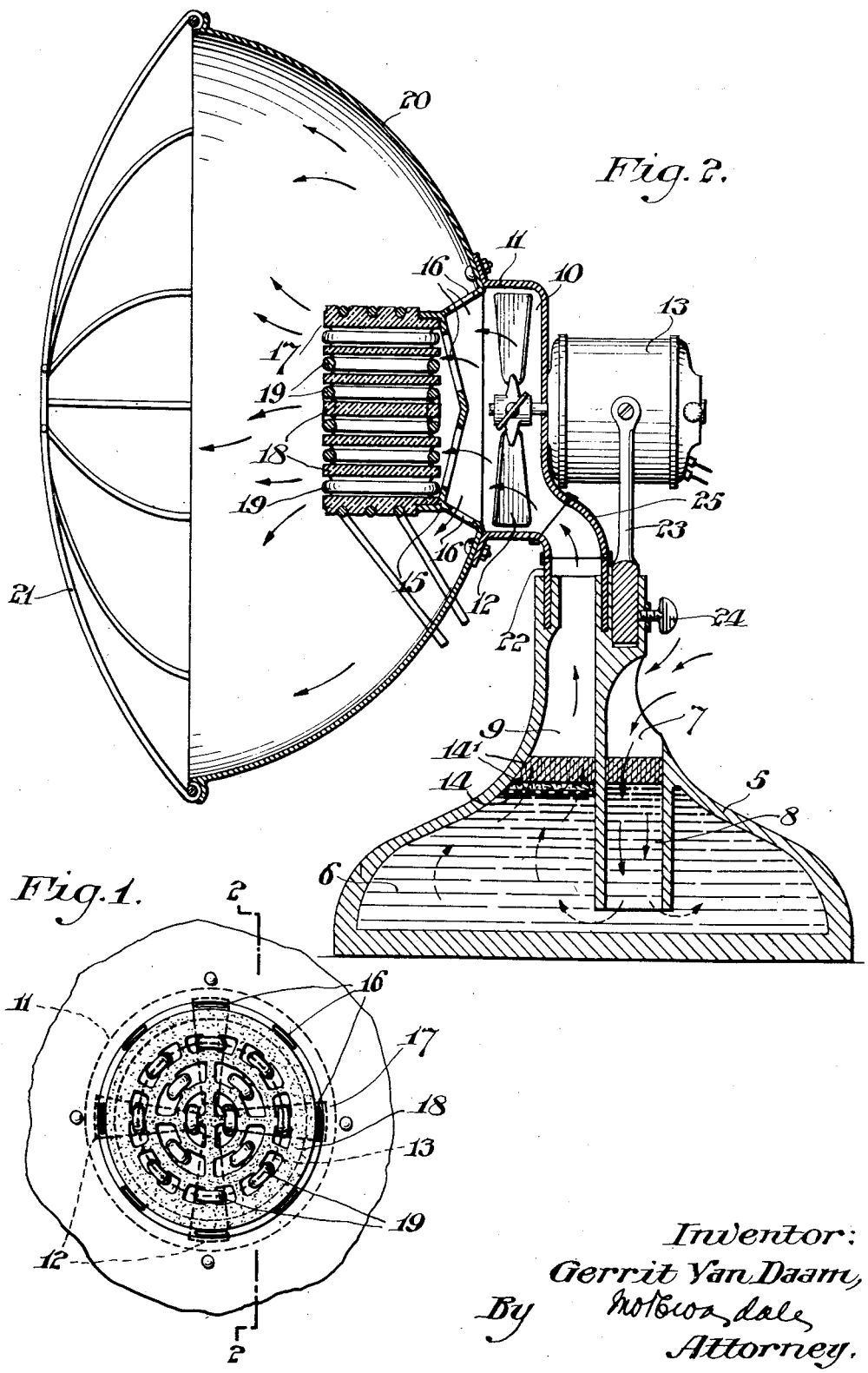

Patented Feb. 23, 1932

1,846,233

UNITED STATES PATENT OFFICE

GERRIT VAN DAAM, OF BUFFALO, NEW YORK

MEANS FOR CLEANING, MOISTENING AND HEATING AIR

Application filed June 4, 1930. Serial No. 459,146.

The invention relates to improved means for cleaning, moistening and heating air. The object is to provide, in a self-contained unit, simple and efficient means for cleaning, moistening and heating air.

The invention comprises a reservoir for water, means for introducing air thereto so that the same will pass through the water, a channel leading therefrom to a blower housing, a blower in said housing and an electrical heating resistance in the path of travel of the air projected by the blower.

Referring to the drawings, which illustrate merely by way of example a suitable embodiment of my invention;—

Fig. 1 is a fragmentary front elevation.

Fig. 2 is a section on line 2, 2 of Fig. 1.

Similar numerals refer to similar parts throughout the several views.

In accordance with the example shown, the supporting base 5 is of chambered formation providing a reservoir 6 for water or other suitable liquid. An air inlet 7 is connected to the tube 8 which delivers near the bottom of the reservoir 6 beneath the liquid level. A channel 9 delivers upwardly from the reservoir to the chamber 10 provided by the housing 11 in which is mounted the fan 12 operated by the motor 13. A suitable screen 14 is also shown above the liquid level in the channel 9. This screen is preferably provided with a body of filtering material such as 14'. The housing 11 is provided with a shell formation 15 having ports 16 delivering around and through apertures in the heating element 17. This heating element 17 comprises preferably a cylindrical body 18 of refractory material, having a series of channels parallel with the axis of the body and arranged in circular rows. These channels are provided with the usual strands 19 of electric resistance threaded therethrough.

The housing 11 also supports the hemispherical shield or deflector 20 to which is attached the usual wire guard 21. The housing 11 has an extension 22 of tubular formation having telescopic and adjustable engagement with the base formation 5 and forms a continuation of the air passage 9 from the reservoir to chamber 10. This connecting portion 22 may have a section 25 of elastic material, such as a rubber hose, for facilitating the adjustment of the housing 11 and heater 17. The motor 13 is supported on a bifurcated formation 23 which is adjustably connected with the base formation 5. The position of adjustment is secured by the set-screw 24.

It will be understood that the reservoir 6 in the base 5, is merely an example of a convenient arrangement for bringing a body of liquid into convenient relationship with the other elements of the combination. I have not shown means for maintaining a supply of liquid in said reservoir. For this purpose, any convenient connection with a water supply or source may be used, controlled either arbitrarily or preferably automatically.

What I claim is:—

1. The combination of a supporting base tapering upwardly into a neck and providing an air passage therethrough, a housing supported by the neck, connected with said air passage, and provided with air discharge ports, an electric heater in front of said ports, a fan mounted within said housing and a motor also supported by said neck for driving the fan.

2. The combination of a supporting base tapering upwardly into a neck and providing an air passage therethrough, said base providing a water reservoir, means forming an air passage into said reservoir and discharging below the water level therein, a housing supported by the neck, connected with said air passage and provided with air discharge ports, an electric heater in front of said ports, a fan mounted within said housing and a motor also supported by said neck for driving the fan.

3. The combination of a supporting base tapering upwardly into a neck and providing an air passage therethrough, said base providing a water reservoir, means forming an air inlet passage to said reservoir and discharging below the water level therein, a filter provided between the water level and an air passage, a housing supported by the neck, connected with said air passage therein and provided with air discharge ports, an electric heater in front of said ports, a fan mounted within said housing and a motor also supported by said neck for driving the fan.

4. The combination of a supporting base tapering upwardly into a neck and providing an air passage therethrough, a housing supported by the neck connected by a flexible connection with said air passage and provided with air discharge ports, an electric heater in front of said ports, a fan mounted within said housing and a motor also supported by said neck for driving the fan.

5. The combination of a supporting base tapering upwardly into a neck and providing an air passage therethrough, a housing supported by the neck connected with said air passage and provided with air discharge ports, an electric heater supported by said housing in front of said ports, a fan mounted within said housing and a motor also supported by said neck for driving the fan.

GERRIT VAN DAAM.